United States Patent [19]
Villaveces

[11] Patent Number: 4,588,202
[45] Date of Patent: May 13, 1986

[54] CART FOR TRANSPORTING COMPUTER COMPONENTS

[76] Inventor: James Villaveces, 3300 San Luis St., Ventura, Calif. 93003

[21] Appl. No.: 655,761

[22] Filed: Oct. 1, 1984

[51] Int. Cl.[4] .............................................. B62B 1/04
[52] U.S. Cl. .................................. 280/655; 280/47.21; 280/47.37 R; 280/723
[58] Field of Search ................. 280/655, 47.21, 47.22, 280/47.24, 47.27, 47.34, 47.37 R, 642, 723

[56] References Cited

U.S. PATENT DOCUMENTS

| | | | |
|---|---|---|---|
| Re. 28,936 | 8/1976 | Talamantez | 280/47.21 |
| 1,215,085 | 2/1917 | Wannenwetsch | 280/47.37 R |
| 2,540,279 | 2/1951 | Mosier | 280/723 |
| 2,716,557 | 10/1955 | Gould | 280/47.34 |
| 2,738,185 | 3/1956 | Coskun | 280/723 |
| 4,378,946 | 4/1983 | Voytko et al. | 280/642 |
| 4,426,099 | 1/1984 | Gross | 280/655 |

FOREIGN PATENT DOCUMENTS 1061121  3/1967  United Kingdom ................ 280/723

Primary Examiner—John A. Pekar
Assistant Examiner—Karin L. Ferriter
Attorney, Agent, or Firm—Milton S. Gerstein

[57] ABSTRACT

A cart for transporting computer instruments, and the like, from one location to another in which the rear rollers of the cart are mounted by torsion bars to decrease the likelihood of damage to the parts being transported. In one embodiment of the invention, the torsion bars are supported by connecting blocks that allow relative sliding movement of the two rollers to increase and the decrease the distance between the rollers to adapt the cart to the particular size and weight of the item being transported. In another embodiment of the invention, the handle portion of the cart is divided into two section pivotable relative to each other and pivotally connected to the main supporting frame of the cart for folding and collapsing the cart during nonuse.

12 Claims, 6 Drawing Figures

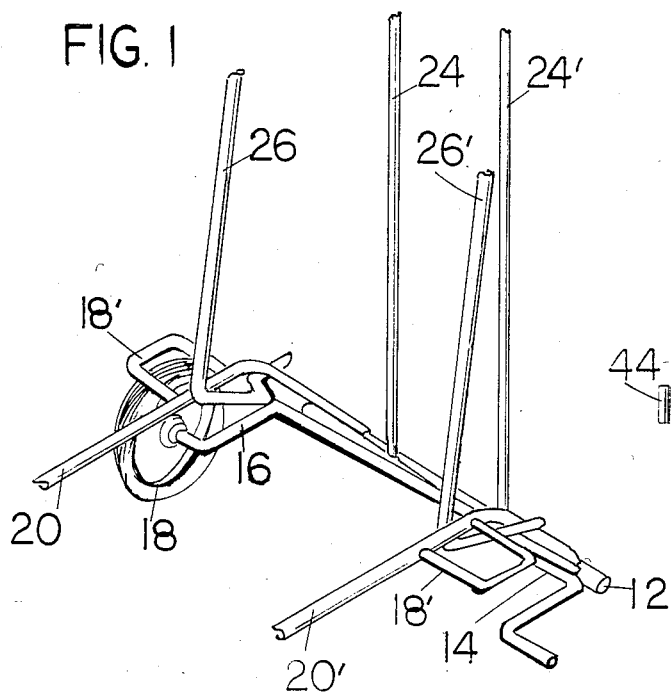
FIG. 1
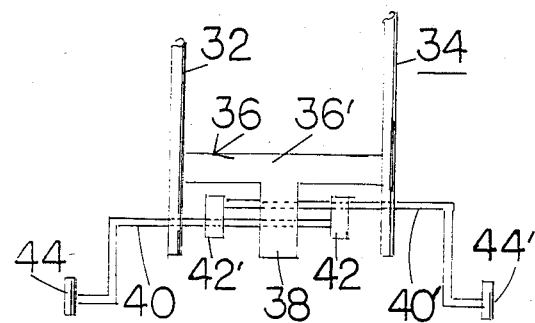
FIG. 2
FIG. 3
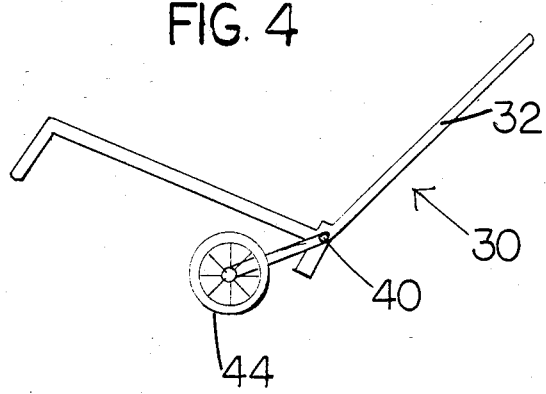
FIG. 4
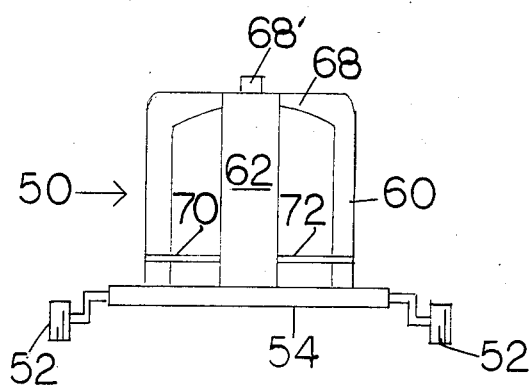
FIG. 6
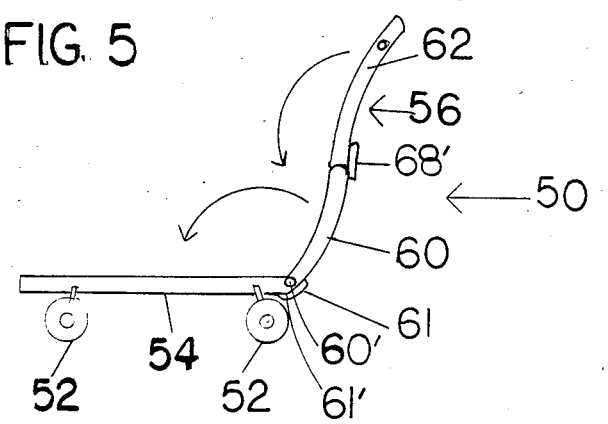
FIG. 5

CART FOR TRANSPORTING COMPUTER COMPONENTS

BACKGROUND OF THE INVENTION

The present invention is directed to a cart for transporting computer components from one location to another. Since computer components and equipment are highly sensitive and prone to damage upon unusually large vibratory movement and sudden jolts, it is highly advantageous to ensure that the components, when being transported from one portion of a room or from one room to another and the like, are adequately protected during such transport from these potentially damaging causes. Hitherto, there have not been any adequate transport equipment that is suited directly to transport of computer components. Presently-available carts, such as luggage carts, do not provide sufficient shock-absorbing qualities to allow for safety-proven transport of computer components. Examples of prior art luggage carts, and the like, are to be found in the following prior art:
U.S. Pat. No. 3,998,476—Kazmark;
U.S. Pat. No. 4,062,565—Holtz;
U.S. Pat. No. 4,248,453—Stark;
U.S. Pat. No. 4,286,796—Esposito.

SUMMARY OF THE INVENTION

The present invention is directed to a cart for transporting computer components, and the like, and may also be used to carry luggage, or any item needing transport that is fittable upon the main frame of the cart of the present invention.

The cart of the present invention is provided with torsion bars for each wheel that is used for the main frame of the cart, so that shocks and other jolts may be readily and safely absorbed, so as to prevent damage to the computer equipment, or the like, riding along with the cart.

In a first embodiment of the invention, the torsion bars are also mounted for sliding movement relative to each other so as to adjust the distance between rollers, or wheels, rollingly supporting the main frame of the cart. This adjustment allows for the appropriate base for supporting the particular type of load that is being transported. Means are provided for fixing the spacing between the wheels, or rollers, after the desired distance has been achieved.

In another embodiment of the invention, the handle of the cart is divided into two sections, each of which is pivotally mounted relative to the other. This pivotal mounting allows for the collapse of the handle for storing and folding the cart of the present invention. The collapsible handle is usable in conjunction with the torsion bars of the first embodiment.

BRIEF DESCRIPTION OF THE DRAWING

The invention will be more readily understood with reference to the accompanying drawing, wherein FIG. 1 is a perspective view showing the torsion bar suspension of the present invention applied to the underside of a conventional cart;

FIG. 2 is a partial, rear view showing a modification of the torsion bar suspension of the present invention, where the rollers are allowed to vary in relative distance;

FIG. 3 is a detail cross-sectional view showing a mounting block of the torsion bar suspension of FIG. 2;

FIG. 4 is a side, elevational view showing a cart in which is mounted the torsion bar suspension of FIG. 2;

FIG. 5 is a side elevational view showing another embodiment of the present invention where a cart has a collapsible handle portion; and FIG. 6 is a front, elevational view of the cart of FIG. 5 showing the handle portion collapsed through its first stage.

DETAILED DESCRIPTION OF THE INVENTION

Referring now to the drawings in greater detail, FIG. 1 shows a conventional cart for transporting items, in which axle 12 would normally mount on its ends a pair of wheels or rollers. Since, however, the present invention has as its main objective the transporting of computer equipment and components, a pair of torsion bars 14 and 16 have been added to the underside of the cart, and welded to the axle 12, which serves now the only purpose of providing anchorage to the torsion bars. Each torsion bar has its own axle extension, respectively, upon which is rotatably mounted a wheel 18, only one of which is shown in FIG. 1 for clarity. Each wheel 18 is attached to its respective axle extension by a cotter pin and is also protected by a bumper 18'. The torsion bars are also welded to each other at appropriate portions therealong. Each torsion bar 14 and 16 thus serves to cushion the ride of the component that has been placed on the main carrying frame of the cart, which main carrying frame is shown partially by rods 20 and 20' in FIG. 1. Bars or poles 24, 24' and frame members 26, 26' are conventional and serve to form the handle portion of the cart by which the cart itself is pushed or pulled during transport.

The cart shown in FIG. 1 has been described to show the fact that in order to transport computer equipment and components safely and carefully, sufficient support structure must be provided, which the present invention has achieved by the provision of torsion bars to the already-existing axle of the cart. FIGS. 2 through 4 show a modification of the present invention, and constitutes the preferred form of the invention. The cart of FIGS. 2–4 not only provides cushioned, torsion bar suspension for the frame structure, but also allows for the relative adjustment of the spacing of the two wheels of the cart, which wheels are the rear wheels, or rollers, upon which the cart rides during transport.

The cart 30 of FIG. 4 is provided with a pair of vertically-upstanding bars 32, 34 which constitute the handle portion of the cart 30. The bars 32 and 34 are spaced apart, as clearly shown in FIG. 2. Affixed between the two bars 32 and 34, adjacent the lower portions thereof, is a mounting block 36 having a first base section 36' that actually spans the distance between the two bars 32 and 34 and which is fixedly connected to the bars at the appropriate lower portions thereof. The mounting block 36 is also provided with a downwardly-extending tongue member 38 projecting from the mid-portion of the first base section 36'. This second tongue member portion 38 serves as a guide in which slide the longitudinally-axially extending portions of two torsion bars 40, 40'. Each axially extending portion 40 and 40' is slidingly received in appropriate holes in the second tongue member portion 38, so that each torsion bar may move therein. Each torsion bar axially extending portion 40 and 40' is affixed to a sliding mounting block or stop 42,42' respectively. Each mounting block or stop 42 and 42' also has a through-hole to allow passage of the other torsion bar to which it is not connected, as shown in FIG. 2, and particularly in FIG. 3. In FIG. 3, the through hole 40" is shown allowing passage therethrough of the torsion bar 40, such that the torsion bar 40 has ample space and room to move therein in a longitudinal, axial direction, and in an up-and-down movement, while also allowing the sideways movement of the torsion bar.

As evident in FIG. 2, the rollers 44 and 44' are connected to the torsion bars in a manner similar to that of the embodiment of FIG. 1. The spacing between the rollers, or wheels, 44, 44' may be adjusted to conform to a type of load being carried by the cart, to the conditions prevailing in the environment in which the cart is to be used, and to the span of the load. The limits of the adjustment of the spacing of the rollers is achieved in a first direction by the contact of the two mounting blocks or stops 42,42' against one another. In the other direction, the limit of movement is achieved by the contact of a respective mounting block or stop 42 and 42' against its respective bar 34 and 32, respectively. Intermediate positions of the rollers, as well as their limits, are secured in place by any conventional means, such as a screw extendable through an opening in each mounting block or stop 42, 42', which screw contacts the axially extending portion of a torsion bar in the interior of the hole 40" to thereby hold the torsion bar fixed at its position to which it was set. Of course, any other well-known means for holding the relative positions of the torsion bars may be used. For example, extendable and contractable screws may be supplied, where one screw is rotatably mounted in the tongue member portion 38, between the openings of the tongue member in which slide the torsion bars, on one side of the tongue member, for extension toward one of the stops 42, 42', while a second screw is mounted between the holes of the tongue member for extension toward the other stop. A third and fourth screw would be supplied in the lower portion of each of the bars 32 and 34 opposite a stop 42, 42' for extension and contraction therefrom to thus limit relative movement of the stops relative to each other, and to thus limit the whole supporting structure including both of the torsion bars and stops relative to the tongue member 38. It is within the scope and purview of the invention to provide for fixed connection of the blocks 42,42' to base section 36', in which case the rollers would not be adjustable relative to each other. In this case, the flange or ear 38 would not be necessary.

FIGS. 5 and 6 show another embodiment of the present invention in which there is provided a collapsible handle portion for the cart utilizing the torsion bar suspension shown in detail in FIGS. 2–4. FIG. 5 shows, by way of example, a cart 50 having four wheels or rollers 52, though, of course, only one pair of rollers may be provided, as in FIG. 4. The cart 50 has main supporting portion 54 upon which is placed the item to be carried and transported. Pivotally mounted to the end of portion 54 is a handle portion 56 comprised of two pivotal sections 60 and 62, each section being pivotal relative to the other. The lower end of the pivotal section 60 is pivotally connected to the main supporting portion 54, as shown in FIG. 5, by pivot pin 60'. The section 60 is limited in rotation in the clockwise direction, as viewed in FIG. 5, by a plate 61 having a first end fixedly attached to the lower portion of the section 60, and which plate 61 also has an overlapping portion 61' that contacts the underside of the main supporting portion 54 when the section 60 is pivotted to its extreme in the clockwise direction.

The upper pivotal section 62 is pivotally connected to the lower section 60 by its lower section thereof, which enwraps the narrower middle portion 68 of the upper portion of the section 60, as clearly shown in FIG. 6. Another plate 68' is mounted to the lower portion of the section 62, to limit the clockwise rotation of the section 62, relative to the lower section 60. The pivotal section 60 preferably has an enlarged cut-out portion, as shown in FIG. 6, in which is received the upper pivotal section 62 upon collapse thereof. To ensure that the upper pivotal section 62 is held fast within the contour of the pivotal section 60, the lower pivotal section 60 is provided with a pair of oppositely-disposed grooves (not shown) in which are received a pair of holding bars 70 and 72 pivotally attached to the upper portion of the pivotal section 62. The bars 70 and 72 preferably fold up into appropriate recesses in the side surfaces of the section 62 during normal use of the cart, but pivot outwardly when collapsing the handle portion, so as to be received and held within the grooves of the pivotal section 60. Well-known and conventional pivoting structures may be employed to mount the bars 70 and 72 to the side surfaces of the section 62. Also, preferably, each groove in the section 60 is of such a width as to snugly receive a respective holding bar 70 or 72. Clearly, both of the front and rear pair of rollers or wheels of the cart shown in FIG. 5 may be provided with torsion bar suspension in the manner shown in FIG. 2 or in the manner shown in FIG. 1.

While specific embodiments of the invention have been shown and described, it is to be understood that numerous changes and modifications thereof may be made without departing from the scope and spirit of the invention, as set out in the appended claims.

What is claimed is:

1. A cart for use in transporting computer instruments, luggage, and the like, comprising:

a main frame having at least one pair of rollers for rollingly supporting said main frame for transport;

torsion bar suspension means supporting said at least one pair of rollers, said torsion bar suspension means comprising a first torsion bar having a first end to which is mounted one of said rollers, and a second end spaced from said first end; and a second torsion bar having a first end to which is mounted another of said rollers;

said main frame having means for slidingly mounting each of said torsion bars therein, said means comprising at least a pair of openings so that said pair of torsion bars are received therein for sliding movement and rotational movement relative to said means;

said torsion bar suspension means further comprising a first connecting block fixedly connected to the second end of said one torsion bar, and a second connecting block fixedly connected to said another torsion bar at the second end thereof; each of said connecting blocks further having a through-hole through which the torsion bar not fixedly connected thereto is slidingly mounted so that the respective connecting block has relative movement relative to the torsion bar not fixedly connected to it.

2. The cart according to claim 1, wherein said throughhole of each of said connecting blocks is spaced from the portion thereof fixedly connected to its respective torsion bar in a direction toward the torsion bar to which it is not fixedly connected.

3. The cart according to claim 2, wherein said first and second torsion bars are spaced apart and run parallel to each other and parallel to the end surface of said main frame for substantilly major portions of said pair of torsion bars.

4. The cart according to claim 2, further comprising handle means having a first lower end portion connected to said main supporting frame, and a second upper end portion elevated from said first lower end portion; said first lower end portion being pivotally connected to said main supporting frame, said main supporting frame comprising means for pivotally supporting said handle means for pivotal rotation in a first direction and for preventing pivotal rotation in the opposite direction.

5. The cart according to claim 4, wherein said first direction is the direction that rotates said handle means toward said main supporting frame such that said second upper end portion of said handle means moves downwardly toward said main supporting frame and laterally toward said main supporting frame.

6. The cart according to claim 5, wherein said handle means comprises a first pivotal section having said lower end portion as its lower portion connected pivotally to said main supporting frame, and a second pivotal section having said second upper end portion as its upper end; first pivotal section comprising means for pivotally mounting said second pivotal section thereto at the upper end portion of said first pivotal section, so that said second pivotal section may be pivotally rotated to bring said second pivotal section into flush engagement with said first pivotal section, and, thereafter, pivotally rotating said first pivotal section relative to said main supporting frame to bring said first and second pivotal sections into flush engagement with the surface of said main supporting surface to thereby collapse said cart for folding and storage.

7. The cart according to claim 6, wherein said first pivotal section has a substantially convex-shaped surface, and said second pivotal section has a substantially concave-shaped surface, so that when said first section is rotated to collapse said handle means, said surfaces of said first and second sections cooperate and complement one another so that said surfaces lie flush with each other.

8. The cart according to claim 7, wherein said main supporting frame comprises two pairs of rollers, one of said pairs being mounted to said main supporting frame on the rear portion thereof, and one of said pairs of rollers being mounted on the front portion thereof.

9. The cart according to claim 6, wherein said first pivotal section comprises a cut-out portion for receiving therein said second pivotal section when said second pivotal section is rotated toward said first pivotal section for collapse and storage; each of said first and second pivotal section comprising cooperating means for holding said second pivotal section firmly in said cut-out portion of said first pivotal section, so that said second pivotal section does not become free during storage and non-use.

10. A cart for supporting and transporting computer instruments, and the like, comprising:
    a main supporting frame upon which is supported a computer instrument, item to be carried, and the like, said main supporting frame having a first main end surface and a second main end surface, and at least one pair of rollers operatively associated with at least one of said first main end surface and said second main end surface for rollingly supporting said main frame for transport from one location to another location;
    means for mounting each said roller of said at least one pair of rollers for providing suspension thereto to cushion the ride of the cart, said means for mounting each said roller comprising a torsion bar having a first end to which a respective roller is rotatably mounted; said torsion bar of each of said means for mounting being fixedly connected to a portion of said main supporting frame, whereby the means for mounting each roller cushions the ride of the cart in order to prevent any accidental damage to the computer instruments carried thereon;
    each of said torsion bars having a main elongated portion spanning the entire width of said main supporting frame, said main elongated portions of said torsion bars being fixedly connected to each other along at least substantially a portion of the lengths thereof, such that said main elongated portions overlap and are parallel substantially along the lengths thereof;
    said main supporting frame comprising means for mounting said mutually-fixed main elongated portions thereof for fixedly connecting said torsion bars to said main supporting frame;
    each said torsion bar having a second end remote from said first end thereof facing toward the first end of the other torsion bar; said first end of each said torsion bar being spaced from and lying in a different plane as said second end of its respective said torsion bar, whereby the roller mounted by the respective said first end has a center of rotation spaced from said main elongated portion of its respective said torsion bar; each said torsion bar comprising an angular member connecting the respective said main elongated portion with its respective said first end in order to allow for the offset of said first end from said main elongated portion.

11. The cart according to claim 10, wherein said main elongated portions of said torsion bars are welded to each other substantially along the lengths thereof, and said second end of each said torsion bar being constituted by the end of its respective said main elongated portion remote from the respective said angular member.

12. The cart according to claim 11, wherein said second end of each said torsion bar lies directly adjacent said angular member of the other of said torsion bars; said means for mounting the mutually-affixed main elongated portions comprising a shaft element on the underside of said main supporting frame to which said main elongated portions are fixedly connected.

* * * * *